United States Patent [19]

Sudo

[11] Patent Number: 5,187,199
[45] Date of Patent: Feb. 16, 1993

[54] CLEAR COATING COMPOSITION AND METHOD OF PRODUCING SAME

[75] Inventor: Nobuhisa Sudo, Yokohama, Japan

[73] Assignee: Nippon Paint Co., Ltd., Osaka, Japan

[21] Appl. No.: 762,106

[22] Filed: Sep. 19, 1991
(Under 37 CFR 1.47)

[30] Foreign Application Priority Data

Sep. 20, 1990 [JP] Japan .................................. 2-251301

[51] Int. Cl.$^5$ ...................... C08L 33/02; C08L 61/28
[52] U.S. Cl. ................................... 523/523; 523/500;
524/513; 525/124; 525/165; 525/166; 525/443;
525/518; 525/519; 525/520
[58] Field of Search ................. 523/500, 523; 524/513;
525/124, 165, 166, 443, 518, 519, 520

[56] References Cited

U.S. PATENT DOCUMENTS

| | | | |
|---|---|---|---|
| 4,122,055 | 10/1978 | Tugukuni et al. | 524/513 |
| 4,510,275 | 4/1985 | Ihikura et al. | 524/513 |
| 5,100,735 | 3/1992 | Chang | 428/461 |

FOREIGN PATENT DOCUMENTS

| | | | |
|---|---|---|---|
| 1310773 | 12/1089 | Japan . | |
| 1158079 | 6/1989 | Japan . | |
| 2142868 | 5/1990 | Japan | 525/443 |
| 2068000 | 8/1981 | United Kingdom | 524/513 |

OTHER PUBLICATIONS

Abridged English translation of Japanese Patent Laid-Open No. 1-158079.
Abridged English translation of Japanese Patent Laid-Open No. 1-310773.

*Primary Examiner*—Paul R. Michl
*Assistant Examiner*—Andrew E. C. Merriam
*Attorney, Agent, or Firm*—Sughrue, Mion, Zinn, Macpeak & Seas

[57] ABSTRACT

The clear coating composition includes (a) an acrylic resin having a number-average molecular weight of 2500–10000 and a hydroxyl number of 70=120, and containing 20–40 parts by weight of styrene and/or its derivative, based on 100 parts by weight of acrylic resin-constituting monomers (solid basis); (b) a polyester resin having a number-average molecular weight of 350–1500 and a hydroxyl number of 150–300; (c) a mixture of (i) an alkyl ether-substituted melamine resin containing 5 or more alkyl ether groups per each triazine ring; and (ii) a melamine resin containing 1.1–3 imino groups per each triazine ring, a weight ratio of the component (i) to the component (ii) being 8/2–5/5; (d) an acid catalyst blocked with an amine having a boiling point of 150°–280° C.; and (e) a blocked isocyanate, weight ratios of the components being (a)/(b)=100/0–60/40; and (c)/(e)=100/0–33/67.

12 Claims, No Drawings

CLEAR COATING COMPOSITION AND METHOD OF PRODUCING SAME

BACKGROUND OF THE INVENTION

The present invention relates to a high solid-type clear coating composition and a method of producing a coated article by utilizing such a clear coating composition, and more particularly to a clear coating composition capable of providing clear topcoats excellent in acid resistance, durability and appearance without suffering from wrinkling after baking, which is suitable for automobiles, buildings, outdoor constructions, etc., and a method of producing a coating by using such a clear coating composition.

Recently, increasingly more attention has been paid to the deterioration of coatings for automobiles, buildings, outdoor constructions, etc., by acidic rain. Topcoats for automobiles, etc. are conventionally produced using acrylic resin paints, polyester resin paints, etc., but when coatings produced from such paints are brought into contact with acidic rain, spots, discoloration, etc., are locally generated, so that the coatings are likely to be damaged or broken.

By using silicone resin paints, fluorine resin paints, polyurethane resin paints, etc., high resistance to acidic rain can be achieved. However, these resins are generally expensive, and their paint quality is are not sufficiently good. Thus, various attempts have been made of provide coatings with high resistance to acidic rain by adding isocyanates, etc., to paints based on acrylic resins, polyester resins, etc.

In the meantime, for the purpose of saving resources and preventing air pollution, so-called high solid-type paints containing amino resins and aqueous paints have recently been used for topcoats of automobile bodies, etc. As high solid-type clear paints for topcoats for automobiles, etc., those containing acrylic resins together with melamine resins are generally used for the purpose of increasing their scratch resistance.

In the process of producing a coating for automobiles, an electrodeposition coating and an intermediate coating are first produced, and then an undercoat (base coat) is formed by using a base paint (undercoat paint containing coloring agents such as metallic pigments, etc.), and thereafter a clear paint is applied to this undercoat by a wet-on-wet system using a high solid-type clear paint, and the two coating layers (undercoat and topcoat) are simultaneously baked by heating. This system is called a "2 coat-1 bake" system.

However, when a high solid-type clear paint containing an acrylic resin and a melamine resin is applied to an aqueous undercoat and baked, the resulting coating is likely to suffer from damage such as wrinkling, etc., so that its appearance is not satisfactory. Also, cross-linking is insufficient in the coating layer, leading to poor hardness, weathering resistance, etc.

Under such circumstances, active development has been made to provide clear paints which can provide, as paints for automobile bodies, coatings having well-balanced properties such as good resistance to acidic rain, good appearance, good weathering resistance, etc., by a low-pollution system (as a high solid-type using little or substantially no solvents), on aqueous undercoats.

For instance, Japanese Patent Laid-Open No. 1-158079 discloses a coating composition comprising a particular acrylic copolymer, an alkyl ether-substituted melamine resin, and optionally a blocked polyisocyanate.

Also, Japanese Patent Laid-Open No. 1-310773 discloses a method of producing a clear coating comprising the steps of applying a heat-curable aqueous paint containing pigments to a surface to be coated, drying or curing it, and applying a clear paint containing a polyisocyanate compound as a cross-linking agent to the surface, the molecular weights of the resin portions between cross-linked points in the cured clear coating being adjusted to 200 or less.

However, although coatings produced by the above composition and the method have certain levels of acid resistance and scratch resistance, they fail to show good surface appearance together with good acid resistance and durability, which are required on clear paints applied onto aqueous undercoats.

OBJECT AND SUMMARY OF THE INVENTION

Accordingly, an object of the present invention is to provide a clear coating composition capable of providing coatings having good resistance to acidic rain, good appearance and high cross-linking percentage without causing wrinkling after baking in a low-pollution coating system.

Another object of the present invention is to provide a method of producing a coating having the above advantages by utilizing such a clear coating composition.

As a result of intense research in view of the above objects, the inventors have found that in a 2 coat-1 bake system utilizing the conventional clear paints, wrinkling is likely to take place at the time of baking because the high solid-type clear coating composition shows too high an initial reaction speed (curing speed) as compared to the aqueous undercoat paint, and that wrinkling of the clear coating also takes place when amines remain in the undercoat, and further that when the amines are evaporated, they interfere with the activity of an acid catalyst in the clear topcoat, leading to poor cross-linking percentage of the topcoat. The inventors also have found that when an acid catalyst blocked with a particular amine and a particular type of a melamine resin are used, topcoats having good appearance, excellent acid resistance, high cross-linking percentage and good durability can be obtained without causing wrinkling. Also, by adding a blocked isocyanate and a polyester in combination, the acid resistance of the resulting coating is further improved. The present invention has been completed based on the above findings.

Thus, the clear coating composition according to the present invention comprises:
(a) an acrylic resin having a number-average molecular weight of 2500–10000 and a hydroxyl number of 70–120, and containing 20–40 parts by weight of styrene and/or its derivative, based on 100 parts by weight of acrylic resin-constituting monomers (solid basis);
(b) a polyester resin having a number-average molecular weight of 350–1500 and a hydroxyl number of 150–300;
(c) a mixture of:
  (i) an alkyl ether-substituted melamine resin containing 5 or more alkyl ether groups per each triazine ring; and
  (ii) a melamine resin containing 1.1–3 imino groups per each triazine ring, the weight ratio of the component (i) to the component (ii) being 8/2-5/5;
(d) an acid catalyst blocked with an amine having a boiling point of 150°-280° C.; and
(e) a blocked isocyanate,
weight ratios of the components being:
(a)/(b) = 100/0-60/40; and
(c)/(e) = 100/0-33/67.

The first method of forming a coating according to the present invention comprises the steps of:
(1) applying an aqueous undercoat paint neutralized with an amine to form an undercoat layer; and
(2) applying to the undercoat layer a clear coating composition comprising (a) an acrylic resin having a number-average molecular weight of 2500-10000 and a hydroxyl number of 70-120, and containing 20-40 parts by weight of styrene and/or its derivative, based on 100 parts by weight of acrylic resin-constituting monomers (solid basis); (b) a polyester resin having a number-average molecular weight of 350-1500 and a hydroxyl number of 150-300; (c) a mixture of (i) an alkyl ether-substituted melamine resin containing 5 or more alkyl ether groups per each triazine ring; and (ii) a melamine resin containing 1.1-3 imino groups per each triazine ring, the weight ratio of the component (i) to the component (ii) being 8/2-5/5; (d) an acid catalyst blocked with an amine having a boiling point of 150°-280° C., which is at least 15° C. higher than the boiling point of the amine for neutralizing the aqueous undercoat paint; and (e) a blocked isocyanate, weight ratios of the components being (a)/(b) = 100/0-60/40; and (c)/(e) = 100/0-33/67.

The second method of forming a coating according to the present invention comprises the steps of:
(1) applying an aqueous undercoat paint neutralized with an amine to form an undercoat layer;
(2) applying in a wet-on-wet number to the undercoat layer a clear coating composition comprising (a) an acrylic resin having a number-average molecular weight of 2500-10000 and a hydroxyl number of 70-120, and containing 20-40 parts by weight of styrene and/or its derivative, based on 100 parts by weight of acrylic resin-constituting monomers (solid basis); (b) a polyester resin having a number-average molecular weight of 350-1500 and a hydroxyl number of 150-300; (c) a mixture of (i) an alkyl ether-substituted melamine resin containing 5 or more alkyl ether groups per each triazine ring; and (ii) a melamine resin containing 1.1-3 imino groups per each triazine ring, the weight ratio of the component (i) to the component (ii) being 8/2-5/5; (d) an acid catalyst blocked with an amine having a boiling point of 150°-280° C., which is at least 15° C. higher than the boiling point of the amine for neutralizing the aqueous undercoat paint; and (e) a blocked isocyanate, weight ratios of the components being (a)/(b) = 100-0-60/40; and (c)/(e) = 100/0-33/67; and
(3) baking the coated two layers.

DETAILED DESCRIPTION OF THE INVENTION (a) Acrylic Resin

The acrylic resins usable in the present invention are those having a number-average molecular weight of 2500-1000 and a hydroxyl number of 70-120 and containing 20-40 parts by weight of styrene monomers and/or styrene derivative monomers per 100 parts by weight of the solid components of the acrylic resins. Such acrylic resins can be produced, for instance, from the following monomers by a usual method:

(1) Ethylenic monomers containing hydroxyl groups such as hydroxymethyl (meth)acrylate, hydroxyethyl (meth)acrylate, hydroxypropyl (meth)acrylate, hydroxybutyl (meth)acrylate, N-methylol acrylamine, etc.;

(2) Ethylenic monomers containing carboxyl groups such as (meth)acrylic acid, crotonic acid, itaconic acid, fumaric acid, maleic acid, etc.; and (3) Ethylenic monomers copolymerizable with the above monomers (1) and (2) such as alkyl (meth)acrylates including methyl (meth)arcylate, ethyl (meth)acrylate, propyl (meth)acrylate, n-butyl acrylate, isobutyl acrylate, 2-ethylhexyl acrylate, n-octyl acrylate, n-dodecyl acrylate, etc., and (meth)acrylonitrile; and (4) Styrene, or styrene derivatives such as α-methylstryrene, o-methylstryrene, m-methylstryrene, p-methylstryrene, p-tert-butylstyrene, etc.

When the number-average molecular weight of the acrylic resin is less than 2500, sufficient cross-linking does not take place in the resulting coating layer, so that the coating layer shows a poor weathering resistance, etc. On the other hand, when it exceeds 10000, the coating composition shows an undesirably increased viscosity, and a coating layer having good surface evenness cannot be obtained. The preferred number-average molecular weight of the acrylic resin is 3000-8000.

With respect to the hydroxyl number, when it is less than 70, the resulting coating layer suffers from a poor adhesion and a decreased hardness. On the other hand, when it exceeds 120, the resulting coating layer suffers from a decrease in a water resistance and an acid resistance due to the hydroxyl groups remaining in the coating layer. The preferred hydroxyl number of the acrylic resin is 70-100.

The acrylic resin produced from the above-described monomers should contain 20-40 parts by weight of a styrene monomer and/or its derivative, based on 100 parts by weight of the resin components (on a solid basis). When the content of styrene and/or its derivative is less than 20 parts by weight, the resulting coating layer has an insufficient mechanical strength, and when it exceeds 40 parts by weight, the resulting coating layer has a poor weathering resistance. The preferred content of styrene and/or its derivative is 25-35 parts by weight.

(b) Polyester Resin

The polyester resins usable in the present invention are those having a number-average molecular weight of 350-1500 and a hydroxyl number of 150-300. Since the polyester resins are produced by an esterification reaction of polyvalent alcohols and polybasic acids or their anhydrides, they contain hydroxyl groups in the molecule.

The polyvalent alcohols which may be used in the production of the polyester resins according to the present invention include ethylene glycol, propylene glycol, butylene glycol, 1,6-hexanediol, diethylene glycol, dipropylene glycol, neopentyl glycol, triethylene glycol, glycerin, trimethylol ethane, trimethylol propane, pentaerythritol, dipentaerithritol, etc.

The polybasic acids or their anhydrides which may be used in the present invention include phthalic acid, phthalic anhydride, isophthalic acid, terphthalic acid, succinic acid, succinic anhydride, adipic acid, azelaic acid, sebacic acid, tetrahydrophthalic anhydride, hexahydrophthalic anhydride, maleic anhydride, fumaric acid, itaconic acid, trimellitic anhydride, etc.

The polyester resin usable in the present invention is produced by such a reaction that a molar ratio of the hydroxyl group of the above polyvalent alcohol to the carboxyl group of the above polybasic acid or its anhydride is 1.2-1.8, so that the polyester has residual hydroxyl groups in the molecule.

When the number-average molecular weight of the polyester resin is less than 350, sufficient cross-linking does not take place in the coating layer, and the resulting coating layer does not have sufficient properties. On the other hand, when it exceeds 1500, the viscosity of the paint composition is undesirably increased, and the resulting coating layer does not have a good appearance such as surface evenness, etc. The preferred number-average molecular weight of the polyester is 500-1200.

With respect to the hydroxyl number, when it is less than 150, the resulting coating layer has poor adhesion, resulting in the decrease in the hardening of the paint. When it exceeds 300, the resulting coating layer suffers from a decrease in a water resistance and an acid resistance due to the hydroxyl group retained in the molecule. The preferred hydroxyl number of the polyester resin is 200-300.

(c) Melamine Resins

The present invention uses two types of melamine resins: (i) an alkyl ether-substituted melamine resin having 5 or more alkyl ether groups per each triazine ring, and (ii) a melamine resin having 1.1-3 imino groups per each triazine ring.

The alkyl ether-substituted melamine resin (i) having 5 or more alkyl ether groups per each triazine ring means a melamine resin whose triazine ring has 3 amino groups, on average 5 or more hydrogen atoms of which are substituted by alkanols whose end OH groups are substituted with alkyl ether groups. Such an alkyl ether-substituted melamine resin can be produced by adding methylol groups to the alkyl ether-substituted melamine resin by the addition or addition-condensation reaction of the melamine resin with an aldehyde such as formaldehyde, paraformaldehyde, etc. and then adding alkyl ether groups to the methylol groups.

In the alkyl ether-substituted melamine resins, hydrogen atoms of the methylol groups bonded to the amino groups are substituted with alkyl groups such as a methyl group, and ethyl group, an n-butyl group, an isobutyl group, etc. Among them, a mixture of a methyl ether-substituted melamine resin and a butyl ether-substituted melamine resin is preferable, and the mixing ratio of the methyl ether-substituted melamine to the butyl ether-substituted melamine is preferably 8/2-5/5.

The melamine resin having 1.1-3 imino groups per each triazine ring (ii) means a melamine resin whose triazine ring has 3 amino groups, at which 1.1-3 imino groups are formed on average. The imino group may be generally represented by —NHR, wherein R is an alkyl group, an alkyl ether group such as $CH_2OR'$, etc. In $CH_2OR'$, R' may be a methyl group, an ethyl group, an n-butyl group, an isobutyl group, etc. Incidentally, other amino portions than the imino groups may be substituted with alkyl ether groups.

In a case where both melamine resins (i) and (ii) have $CH_2OR$ groups, for instance, the content of —NHCH$_2$OR per each triazine ring of the melamine resin (i) is 1 or less on average, while the content of —NHCH$_2$OR per each triazine ring of the melamine resin (ii) is 1.1-3 on average.

The melamine resin (i) and the melamine resin (ii) should be used at a weight ratio (i)/(ii) of 5/5-8/2. When this weight ratio is less than 5/5, an excessive reaction takes place in the resin components of the clear coating composition, making it likely to cause surface wrinkling in the coating layer. On the other hand, when it exceeds 8/2, the resulting coating layer has an insufficient acid resistance. The preferred weight ratio of (i)/(ii) is 6/4-8/2.

(d) Blocked Acid Catalysts

The acid catalysts used in the present invention serving as hardening aids mean those acids containing carbon-carbon bonds in the molecule excluding a carbonic acid. Typical examples of the acid catalysts include carboxylic acids such as acetic acid, lactic acid, succinic acid, oxalic acid, maleic acid, decanedicarboxylic acid, (meth)acrylic acid, etc.; sulfonic acids such as paratoluenesulfonic acid, dodecylbenzenesulfonic acid, dinonylnaphthalene(di)sulfonic acid, etc.; esters of organic alkyl phosphoric acids such as dimethyl phosphoric acid, dibutyl phosphoric acid, dimethyl pyrophosphoric acid, dibutyl pyrophosphoric acid, etc. Among these organic acids, sulfonic acids, particularly dodecylbenzene-sulfonic acid and paratoluenesulfonic acid are preferable from the viewpoint of hardenability, rust resistance, chipping resistance, etc.

In the present invention, the acid catalyst is blocked with an amine having a boiling point of 150°-280° C. The amines used in the present invention include alkanolamines such as diethanolamine, etc.; aliphatic primary amines such as octylamine, nonylamine, etc.; aliphatic secondary amines such as dibutylamine, diamylamine, etc.; aliphatic tertiary amines such as tributylamine, tripropylamine, triallylamine, etc.; aromatic amines such as dimethylbenzylamine, aniline, etc.; cycloaliphatic amines such as dimethylcyclohexylamine, etc. Among them, the alkanolamines are preferred, and diethanolamine having a high boiling point and a low basicity is particularly preferable. Incidentally, the boiling point of the amine for blocking the acid catalyst should be higher than those of the amines used for neutralizing aqueous undercoat paints by 15° C. or more.

Since an amine having a boiling point of less than 150° C. is usually used in an aqueous undercoat paint, the amine in the aqueous undercoat paint is evaporated at the time of preheating and baking while the acid catalyst is kept blocked with the amine having the above boiling point. Accordingly, the function of the acid catalyst in the clear coating composition is not interfered with, leading to sufficient hardening of the clear coating. On the other hand, when an amine having a boiling point exceeding 280° C. is used for blocking the acid catalyst, it is likely to remain in the clear coating, interfering with the reaction of the acid catalyst with the acrylic resin and the melamine resin, and sometimes causing yellowish discoloration of the clear coating. Incidentally, even when an amine having a boiling point of 280° C. or lower is used, it is preferable that it has a low basicity. Accordingly, an acid catalyst consisting of sulfonic acid or its derivative blocked with alkanolamine is most preferable.

(e) Blocked Isocyanate

Used in the present invention are polyisocyanates totally or partially blocked by blocking agents as described below.

The polyisocyanates which are blocked are those compounds containing two or more free isocyanate groups in a molecule. Specific examples thereof include tolylene diisocyanate, 4,4'-diphenylmethane diisocyanate, xylylene diisocyanate, metaxylylene diisocyanate, hexamethylene diisocyanate, lysine diisocyanate, hydrogenated 4,4'-diphenylmethane diisocyanate, hydrogenated tolylene diisocyanate, isophorone diisocyanate, trimethylhexamethylene diisocyanate, dimerized diisocyanate, etc. In addition, urethane compounds produced by reacting the polyisocyanate compounds with small amounts of polyols may also be used as long as they contain two or more isocyanate groups in one molecule. Such urethane compounds are selected from an adduct of tolylene diisocyanate (3 mol) and trimethylol propane (1 mol); an adduct of hexamethylene diisocyanate (3 mol) and trimethylol propane (1 mol); a reaction product of hexamethylene diisocyanate and water; an adduct of xylylene diisocyanate (3 mol) and trimethylol propane (1 mol), etc., and they may be used alone or in combination.

Preferable among the above polyisocyanate compounds are those having a good weathering resistance and thus suffering from no yellowish discoloration, such as a reaction product of hexamethylene diisocyanate and water; an adduct of hexamethylene diisocyanate and trimethylol propane; an adduct of xylylene diisocyanate and trimethylol propane; isophorone diisocyanate; hexamethylene diisocyanate; lysine diisocyanate, etc.

The blocking agents usable in the present invention include oxime-based blocking agents such as acetone oxime, methyl ethyl ketone oxime, cyclohexanone oxime, acetophenone oxime, benzophenone oxime, etc., and alcohol-based blocking agents such as ethylhexanol, etc.

Among the polyisocyanates blocked with the blocking agents, isophorone diisocyanate (IPDI) blocked with methyl ethyl ketone oxime is particularly preferable.

The proportions of the acrylic resin (a), the polyester resin (b), the melamine resins (c), the blocked acid catalyst (d) and the blocked isocyanate (e) are as follows:

First, the weight ratio of the acrylic resin (a) to the polyester resin (b) is 100/0–60/40, preferably 90/10–65/35, and more preferably 80/20–70/30. When the weight ratio of (a)/(b) is less than 60/40, the resulting coating layer has a poor weathering resistance. To achieve a good balance of a high solid content and a coating strength, the content of the component (b) is preferably 5–20 parts by weight.

A weight ratio of the melamine resin (c) to the blocked isocyanate (e) is 100/0–33/67, preferably 90/10–50/50. When the weight ratio of (c)/(e) is less than 33/67, sufficient hardening does not take place in the resulting coating layer, resulting in the decrease in a solvent resistance, etc.

In addition, a weight ratio of the total amount of the acrylic resin (a)+the polyester resin (b) to the total amount of the melamine resin (c)+the blocked isocyanate (e), [(a)+(b)]/[(c)+(e)], is 50/50–85/15, preferably 55/45–80/20. When the weight ratio of [(a)+(b)]/[(c)+(e)] exceeds the above upper limit (namely, when the total amount of the cross-linking agent components (c) and (e) is small), sufficient hardening cannot be achieved in the resulting coating layer. On the other hand, when it is less than the lower limit, the resulting coating layer suffers from a poor acid resistance and an undesirably low strength.

Further, the amount of the blocked acid catalyst (d) is 0.1–3.0% by weight, based on the total resin composition (solid basis). When it is lower than the above lower limit, sufficient effect in hardening cannot be achieved in the resulting coating layer by adding the blocked acid catalyst. On the other hand, when it exceeds the above upper limit, the resulting coating layer undesirably becomes hard and brittle. The amount of the blocked acid catalyst (d) is preferably 0.5–2% by weight, more preferably 0.8–1.5% by weight, based on the total resin components (solid basis).

Aqueous paints for an undercoat lying beneath a clear topcoat produced by the clear coating composition of the present invention may be those neutralized with amines. The aqueous undercoat paint may be either one of a solution type or an emulsion type, as long as it comprises water as its main solvent, and optionally at least one of metallic pigments, mica pigments and color pigments.

Specific examples of the aqueous undercoat paints include an amimo-alkyd resin type, an amino-acrylic resin type, a urethane resin type, an acrylic-urethane resin type, etc. The solvent may be water or a mixture of water and an organic solvent. The organic solvents include, for instance, alcohols such as methanol, ethanol, n-propanol, isopropanol, n-butanol, isobutanol, sec-butanol, tert-butanol, etc.; ketones such as acetone, methyl ethyl ketone, methyl isobutyl ketone, etc.; ethers such as methyl cellosolve, cellosolve, butyl cellosolve, butyl carbitol, etc.; esters such as methyl cellosolve acetate, cellosolve acetate, butyl cellosolve acetate, ethyl acetate, etc.; aromatic hydrocarbons such as benzene, xylene, toluene, etc. These organic solvents may be used alone or in combination. In addition, for the purpose of making the paint resin water-soluble or water-dispersible amines are added to the undercoat paint for neutralization.

The neutralizing amines include aliphatic amines such as diethylamine, butylamine, isobutylamine, sec-butylamine, n-amylamine, sec-amylamine, ethylenediamine, triethylenediamine, diethylenetriamine, hexamethylenediamine, etc., alkanolamines such as ethanolamine, dimethylethanolamine, etc.

In the present invention, the amines for neutralizing the aqueous undercoat paint should have a boiling point lower than that of the amine in the amine-blocked acid catalyst used in the clear topcoat. Specifically, the amine for neutralizing the aqueous undercoat paint should have a boiling point at least 15° C. lower than that of the amine blocking the acid catalyst used in the clear coating composition.

The clear coating composition of the present invention may further contain 0–10% by weight of organic coloring pigments such as phthalocyanine blue, indanthrone blue, quinacridone, isoindorinone yellow, azo yellow, cyanine green, etc.; 0–10% by weight of dyes; 0–10% by weight of transparent mica flakes, fine titanium oxide particles, etc.; and 0–15% by weight of extender pigments such as fine $SiO_2$ particles, talc, etc., in such ranges as not to prevent the object of the present invention.

The clear coating composition of the present invention can be coated as follows: Like the usual painting of the automobiles, the above-described aqueous undercoat paint is first coated as an intermediate coating, pre-heated, for instance, at about 60°–100° C. for 2–10 minutes, and then the clear coating composition according to the present invention is coated by a wet-on-wet system on the intermediate coating. Thereafter baking is conducted at 130°–160° C. for 10–40 minutes to obtain the desired coating. The amount of the clear coating composition applied is preferably determined such that the dry thickness of the clear topcoat is 30-60 μm.

Incidentally, the painting may be conducted by airspraying or electrostatic coating. The viscosity of the clear coating paint is preferably 20-30 seconds/#4 Ford Cup (hereinafter referred to as #4FC) at 20° C. With respect to a coating machine and coating conditions, they may be conventional ones used for the finish painting of automobiles.

The present invention will be explained in further detail by way of the following Examples.

EXAMPLES 1-10, COMPARATIVE EXAMPLES 1-9

A dull steel plate having a thickness of 0.8 mm treated with a zinc phosphate chemical is subjected to electrodeposition coating using a cationic electrodeposition paint [POWERTOP U-50, manufactured by Nippon Paint Co., Ltd.] at a dry thickness of about 25 μm. The resulting coating was baked at 180° C. for 20 minutes.

Next, the resulting electrodeposition coating layer is coated with an intermediate coating paint [OLGA S-90 SEALER, manufactured by Nippon Paint Co., Ltd.] at a dry thickness of about 40 μm by an air-spraying method and baked at 140° C. for 30 minutes. Thereafter, an aqueous undercoat paint manufactured by a method described below is applied at a dry thickness of about 15 μm, and subjected to setting for 5 minutes.

Preparation of Aqueous Undercoat Paint 45 parts by weight of styrene, 117 parts by weight of n-butyl acrylate, 63 parts by weight of methyl methacrylate, 48 parts by weight of 2-hydroxyethyl methacrylate, 27 parts by weight of methacrylic acid, 3 parts by weight of azobisisobutyronitrile and 76 parts by weight of ethylene glycol monobutyl ether as a solvent are used to synthesize a polymer. The resulting polymer is neutralized with dimethylethanol amine (boiling point 135° C.) to provide an acrylic resin varnish having a volatile component of 50% and an number-average molecular weight of 12000. This acrylic resin varnish has a hydroxyl number of 70 and an acid number of 58.

140 parts by weight of this acrylic resin varnish is mixed with 30 parts by weight of methoxymethylol-substituted melamine resin (CYMEL 303, manufactured by American Cyanamide) and 10 parts by weight of an aluminum pigment (metal pigment content: 65%), subjected to stirring and then diluted with deionized water until its viscosity becomes 25-30 seconds (at 20° C.) when measured by using a #4FC, to obtain a metallic coating paint.

Application of Clear Coating Paint

A clear paint having a composition (on a solid basis) as shown in Table 1, whose viscosity is adjusted to 25 seconds by #4FC, is applied under a spraying pressure of 5 kg/cm² at a dry thickness of about 40 μm by using an electrostatic coating machine (AUTO REA gun, manufactured by Lansberg Gemma), subjected to setting for about 10 minutes, and baked at 140° C. for 30 minutes.

Incidentally, the clear paint contains 2% by weight of CHINUBYN 900 and 2% by weight of CHINUBYN 1130 both ultraviolet ray-absorbing agents manufactured by Chiba Geigy, and 2% by weight of a hindered amine light stabilizer (CHINUBYN 292 manufactured by Chiba Geigy), on the basis of solid resin components.

Evaluation of Coatings

Each coating thus produced is evaluated with respect to surface appearance, gloss, pencil hardness and acid resistance as follows:

(1) Film appearance

Each test piece produced by the above method is observed by the naked eye with respect to defects such as wrinkling, and evaluated according to the following standards:

⊚: No defects.
○: Substantially no defects.
Δ: Slight wrinkling.
X: Extreme wrinkling.

(2) Pencil hardness

Measured according to JIS K5400 8, 4.2.

(3) Acid resistance 0.2 ml of a 40-% by weight sulfuric acid solution is dropped onto a horizontally placed test piece kept at 50° C., and left at 50° C. with no air flow for 15 minutes, washed with water and dried to observe etching, discoloration, blistering, etc. by the naked eye. These defects are evaluated according to the following standards:

⊚: No defects.
○: No etching.
Δ: Trace defects.
X: Etched.

(4) Gasoline resistance

Each test piece is immersed in a mixed solution of 90 parts by volume of regular gasoline and 10 parts by volume of ethanol at 40° C. for 1 hour. After immersion, the coating is observed by the naked eye and evaluated according to the following standards.

○: No defects.
Δ: Slightly peeled.
X: Completely peeled.

(5) Water resistance

Each test piece is immersed in tapped water at 40° C. for 10 days, and the coating of the test piece is observed by the naked eye and evaluated according to the following standards.

○: No defects.
Δ: Slightly whitened.
X: Extremely whitened.

(6) Weathering resistance

A weathering test under a UV lamp manufactured by Q Panel is conducted for 2000 hours by repeating a cycle consisting of (a) 70° C. for 8 hours and (b) 50° C. and a relative humidity 100% for 4 hours. After this weathering test, the coating of each test piece is observed by the naked eye and evaluated according to the following standards.

○: No defects.
Δ: Decrease in gloss.
X: Generation of cracks.

The results are shown in Table 1. For comparison, clear paints having compositions shown in Table 1 as Comparative Examples 1-9 are used to produce test pieces, and the same tests as in Example 1 are conducted. The results are also shown in Table 1.

TABLE 1

| Example No. | 1 | 2 | 3 | 4 | 5 | 6 | 7 | 8 | 9 | 10 |
|---|---|---|---|---|---|---|---|---|---|---|
| Paint Composition (Parts by Weight) | | | | | | | | | | |

TABLE 1-continued

| | | | | | | | | | | |
|---|---|---|---|---|---|---|---|---|---|---|
| (a) Acrylic Resin-1[(1)] | 60 | 50 | 42 | 53 | 42 | 42 | 42 | 42 | 60 | 42 |
| Acrylic Resin-2[(2)] | — | — | — | — | — | — | — | — | — | — |
| Acrylic Resin-3[(3)] | — | — | — | — | — | — | — | — | — | — |
| (b) Polyester Resin[(4)] | — | 20 | 17 | 6 | 17 | 17 | 17 | 17 | 20 | 17 |
| (c) Melamine Resin-1[(5)] | 28 | 21 | 17 | 17 | 19.2 | 12 | 25.8 | 9.5 | 14 | 17 |
| Melamine Resin-2[(6)] | 12 | 9 | 7 | 7 | 4.8 | 12 | 11.1 | 4.0 | 6 | 7 |
| (d) Acid Catalyst[(7)] | 1.0 | 1.0 | 1.0 | 1.0 | 1.0 | 1.0 | 1.0 | 1.0 | 1.0 | 1.0 |
| Blocking Amine[(8)] | DETA | DETA | DETA | DETA | DETA | DETA | DETA | DETA | DETA | DMBA |
| (e) Blocked Isocyanate[(9)] | — | — | 17 | 17 | 17 | 17 | 4.1 | 27.5 | — | 17 |
| Weight Ratio | | | | | | | | | | |
| (a)/(b) | 100/0 | 71/29 | 71/29 | 90/10 | 71/29 | 71/29 | 71/29 | 71/29 | 71/29 | 71/29 |
| (c-1)/(c-2) | 70/30 | 70/30 | 70/30 | 70/30 | 80/20 | 50/50 | 70/30 | 70/30 | 70/30 | 70/30 |
| [(c-1) + (c-2)]/(e) | 100/0 | 100/0 | 59/41 | 59/41 | 59/41 | 59/41 | 90/10 | 33/67 | 100/0 | 59/41 |
| (d)/[(a) + (b) + (c-1) + (c-2)] | 1 | 1 | 0.3 | 3 | 1 | 1 | 1 | 1 | 1 | 1 |
| Properties of Film | | | | | | | | | | |
| Appearance | ○ | ○ | ⊚ | ⊚ | ○ | ⊚ | ○ | ⊚ | ○ | ⊚ |
| Pencil Hardness | F | H | H | F | F | F | F | H | HB | H |
| Acid Resistance | ○ | ○ | ⊚ | ⊚ | ⊚ | ⊚ | ○ | ⊚ | ⊚ | ⊚ |
| Gasoline Resistance | ○ | ○ | ○ | ○ | ○ | ○ | ○ | ○ | ○ | ○ |
| Water Resistance | ○ | ○ | ○ | ○ | ○ | ○ | ○ | ○ | ○ | ○ |
| Weathering Resistance | ○ | ○ | ○ | ○ | ○ | ○ | ○ | ○ | ○ | ○ |

| Comparative Example No. | 1 | 2 | 3 | 4 | 5 | 6 | 7 | 8 | 9 |
|---|---|---|---|---|---|---|---|---|---|
| Paint Composition (Parts by Weight) | | | | | | | | | |
| (a) Acrylic Resin-1[(1)] | — | — | 60 | 60 | 60 | 30 | 60 | 60 | 60 |
| Acrylic Resin-2[(2)] | 42 | — | — | — | — | — | — | — | — |
| Acrylic Resin-3[(3)] | — | 42 | — | — | — | — | — | — | — |
| (b) Polyester Resin[(4)] | 17 | 17 | — | — | — | 40 | — | — | — |
| (c) Melamine Resin-1[(5)] | 17 | 17 | 16 | 36 | 28 | 21 | 28 | 28 | 28 |
| Melamine Resin-2[(6)] | 7 | 7 | 24 | 4 | 12 | 9 | 12 | 12 | 12 |
| (d) Acid Catalyst[(7)] | 1.0 | 1.0 | 1.0 | 1.0 | 1.0 | 1.0 | 1.0 | 1.0 | 1.0 |
| Blocking Amine[(8)] | DETA | DETA | DETA | DETA | TETA | DETA | TEA | — | DMEA |
| (e) Blocked Isocyanate[(9)] | 17 | 17 | — | — | — | — | — | — | — |
| Weight Ratio | | | | | | | | | |
| (a)/(b) | 71/29 | 71/29 | 100/0 | 100/0 | 100/0 | 43/57 | 100/0 | 100/0 | 100/0 |
| (c-1)/(c-2) | 70/30 | 70/30 | 40/60 | 90/10 | 70/30 | 70/30 | 70/30 | 70/30 | 70/30 |
| [(c-1) + (c-2)]/(e) | 59/41 | 59/41 | 100/0 | 100/0 | 100/0 | 100/0 | 100/0 | 100/0 | 100/0 |
| (d)/[(a) + (b) + (c-1) + (c-2)] | 1 | 1 | 1 | 1 | 1 | 1 | 1 | 1 | 1 |
| Properties of Film | | | | | | | | | |
| Appearance | ○ | △ | ○ | × | ○ | ○ | × | × | △ |
| Pencil Hardness | F | H | F | H | 2B | F | H | H | F |
| Acid Resistance | △ | × | × | ○ | × | △ | ○ | ○ | ○ |
| Gasoline Resistance | △ | ○ | ○ | ○ | × | △ | ○ | ○ | ○ |
| Water Resistance | ○ | △ | △ | ○ | × | △ | ○ | ○ | ○ |
| Weathering Resistance | ○ | ○ | ○ | ○ | × | × | — | — | ○ |

Note
[(1)] A copolymer of ethyl acrylate, ethylhexyl methacrylate, lauryl methacrylate, hydroxyethyl methacrylate, methacrylate and styrene having a number-average molecular weight of 4900, a hydroxyl number of 95 and a styrene content of 35%.
[(2)] A copolymer of ethylhexyl methacrylate, lauryl methacrylate, hydroxyethyl methacrylate, methacrylate and styrene having a number-average molecular weight of 4900, a hydroxyl number of 95 and a styrene content of 10%.
[(3)] A copolymer of n-butyl acrylate, n-butyl methacrylate, hydroxypropyl acrylate, acrylate and styrene having a number-average molecular weight of 4900, a hydroxyl number of 140 and a styrene content of 20%.
[(4)] A polyester consisting of hexahydrophthalic acid and neopentyl glycol and having a number-average molecular weight of 400 and a hydroxyl number of 270.
[(5)] Methyl, butyl-containing alkoxy-type melamine (CYMEL 1161, manufactured by American Cyanamide, the number of alkyl ether groups per a triazine ring = 5.2).
[(6)] Methyl, butyl-containing imino-type melamine (CYMEL 254, manufactured by American Cyanamide, the number of imino groups per a triazine ring = 1.3).
[(7)] Dodecylbenzenesulfonic acid.
[(8)] DETA: Diethanolamine (boiling point: 268° C.)
DMBA: Dimethyl N-benzyl amine (boiling point: 178° C.).
TETA: Triethanolamine (boiling point: 360° C.).
TEA: Triethylamine (boiling point: 89° C.).
DMEA: Dimethylethanolamine (boiling point: 135° C.).
[(9)] MEK oxime-blocked isocyanate (nurate-type HMDI) (DESMODUR-BL4165, manufactured by Sumitomo K.K.)

As described above in detail, the coatings obtained by using the clear coating composition of the present invention have good appearance, hardness, acid resistance, weathering resistance, etc. without suffering from defects such as wrinkling, etc. The clear coating compositions of the present invention are suitable for clear topcoats for automobiles, buildings, outdoor constructions, etc.

What is claimed is:

1. A clear coating composition comprising:

(a) an acrylic resin having a number-average molecular weight of 2500–10000 and a hydroxyl number of 70–120, and containing 20–40 parts by weight of styrene and/or its derivative, based on 100 parts by weight of acrylic resin-constituting monomers (solid basis);

(b) a polyester resin having a number-average molecular weight of 350–1500 and a hydroxyl number of 150–300;

(c) a mixture of:
 (i) an alkyl ether-substituted melamine resin containing 5 or more alkyl ether groups per each triazine ring; and
 (ii) a melamine resin containing 1.1–3 imino groups per each triazine ring,
a weight ratio of said component (i) to said component (ii) being 8/2–5/5;

(d) an acid catalyst blocked with an amine having a boiling point of 150°–280° C.; and (e) a blocked isocyanate,
weight ratios of said components being:
(a)/(b) = 100/0-60/40; and
(c)/(e) = 100/0-33/67.

2. The clear coating composition according to claim 1, wherein the weight ratio of said acrylic resin (a) to said polyester resin (b) is 90/10-65/35.

3. The clear coating composition according to claim 1, wherein the weight ratio of said acrylic resin (a) to said polyester resin (b) is 80/20-70/30.

4. The clear coating composition according to claim 1, wherein the amount of said blocked acid catalyst is 0.5-2% by weight.

5. The clear coating composition according to claim 1, wherein said blocked acid catalyst is sulfonic acid or its derivative blocked with alkanolamine.

6. The clear coating composition according to claim 1, further comprising at least one of organic coloring pigments, dyes, transparent flake pigments and extender pigments in such a range that said composition substantially retains transparency.

7. A method of producing a coating layer comprising the steps of:
(1) applying an aqueous undercoat paint neutralized with an amine to form an undercoat layer; and
(2) applying to said undercoat layer a clear coating composition comprising (a) an acrylic resin having a number-average molecular weight of 2500-10000 and a hydroxyl number of 70-120, and containing 20-40 parts by weight of styrene and/or its derivative, based on 100 parts by weight of acrylic resin-constituting monomers (solid basis); (b) a polyester resin having a number-average molecular weight of 350-1500 and a hydroxyl number of 150-300; (c) a mixture of (i) an alkyl ether-substituted melamine resin containing 5 or more alkyl ether groups per each triazine ring; and (ii) a melamine resin containing 1.1-3 imino groups per each triazine ring, a weight ratio of said component (i) to said component (ii) being 8/2-5/5; (d) an acid catalyst blocked with an amine having a boiling point of 150°-280° C., which is at least 15° C. higher than the boiling point of the amine for neutralizing said aqueous undercoat paint; and (e) a blocked isocyanate, weight ratios of said components being (a)/(b) = 100/0-60/40; and (c)/(e) = 100/0-33/67.

8. A method of producing a coating layer comprising the steps of:
(1) applying an aqueous undercoat paint neutralized with an amine to form an undercoat layer;
(2) applying in a wet-on-wet manner to said undercoat layer a clear coating composition comprising (a) an acrylic resin having a number-average molecular weight of 2500-10000 and a hydroxyl number of 70-120, and containing 20-40 parts by weight of styrene and/or its derivative, based on 100 parts by weight of acrylic resin-constituting monomers (solid basis); (b) a polyester resin having a number-average molecular weight of 350-1500 and a hydroxyl number o f 150-300; (c) a mixture of (i) an alkyl ether-substituted melamine resin containing 5 or more alkyl ether groups per each triazine ring; and (ii) a melamine resin containing 1.1-3 imino groups per each triazine ring, a weight ratio of said component (i) to said component (ii) being 8/2-5/5; (d) an acid catalyst blocked with an amine having a boiling point of 150°-280° C., which is at least 15° C. higher than the boiling point of the amine for neutralizing said aqueous undercoat paint; and (e) a blocked isocyanate, weight ratios of said components being (a)/(b) = 100-/0-60/40; and (c)/(e) = 100/0-33/67; and
(3) baking the coated two layers.

9. The method according to claim 7, wherein said clear coating composition contains coloring components.

10. The method according to claim 8, wherein said clear coating composition contains coloring components.

11. The method according to claim 7, wherein the weight ratio of said acrylic resin (a) to said polyester resin (b) is 90/10-65/35.

12. The method according to claim 8, wherein the weight ratio of said acrylic resin (a) to said polyester resin (b) is 90/10-65/35.

* * * * *